(12) United States Patent
Jeong et al.

(10) Patent No.: US 10,997,255 B2
(45) Date of Patent: May 4, 2021

(54) APPARATUS, METHOD AND COMPUTER PROGRAM FOR CLOUD SCRAPING USING PRE-SCRAPED BIG DATA

(71) Applicant: COOCON CO., LTD., Seoul (KR)

(72) Inventors: Jae Won Jeong, Gyeonggi-do (KR); Cheong Seok Back, Seoul (KR)

(73) Assignee: Coocon Co., Ltd., Seoul (KR)

( * ) Notice: Subject to any disclaimer, the term of this patent is extended or adjusted under 35 U.S.C. 154(b) by 349 days.

(21) Appl. No.: 16/112,544

(22) Filed: Aug. 24, 2018

(65) Prior Publication Data
US 2019/0332720 A1 Oct. 31, 2019

(30) Foreign Application Priority Data
Apr. 25, 2018 (KR) .......... 10-2018-0047730

(51) Int. Cl.
*G06F 16/95* (2019.01)
*G06F 16/951* (2019.01)
*G06F 11/07* (2006.01)

(52) U.S. Cl.
CPC ........ *G06F 16/951* (2019.01); *G06F 11/0709* (2013.01); *G06F 11/079* (2013.01); *G06F 11/0751* (2013.01); *G06F 11/0778* (2013.01)

(58) Field of Classification Search
CPC .................................................. G06F 16/955
USPC ....................................................... 707/696
See application file for complete search history.

(56) References Cited

U.S. PATENT DOCUMENTS

| | | | |
|---|---|---|---|
| 2003/0033434 A1 | 2/2003 | Kavacheri et al. | |
| 2013/0030959 A1* | 1/2013 | Gray | G06Q 30/0261 705/27.1 |
| 2017/0046438 A1* | 2/2017 | Desineni | G06F 16/24552 |

FOREIGN PATENT DOCUMENTS

| | | |
|---|---|---|
| JP | 2002279080 A | 9/2002 |
| JP | 2003316782 A | 11/2003 |
| JP | 2004272521 A | 9/2004 |
| JP | 2014514656 A | 6/2014 |
| JP | 2017120607 A | 7/2017 |
| KR | 101566616 B1 | 11/2015 |
| KR | 20160125653 A | 11/2016 |
| KR | 20180040252 A | 4/2018 |

* cited by examiner

*Primary Examiner* — Baoquoc N To
(74) *Attorney, Agent, or Firm* — Faegre Drinker Biddle & Reath LLP (57) ABSTRACT

A cloud scraping system using pre-scraped big data includes an information providing server which, when receiving a scraping request from a user terminal, provides the user terminal with response information to the received scraping request, and a big data storage which stores pre-scraped information, wherein when the scraping request is about static information, the information providing server acquires the response information using the pre-scraped information. According to the above cloud scraping system using pre-scraped big data, there is an advantage that it is possible to quickly respond to a scraping request from the user terminal afterwards by pre-scraping and storing static information in the big data storage. Additionally, it is possible to improve the scraping server operation efficiency by making a proper use of a single or multi-processing scraping server based on policy information of a scraping target external institution.

5 Claims, 7 Drawing Sheets

APPARATUS, METHOD AND COMPUTER PROGRAM FOR CLOUD SCRAPING USING PRE-SCRAPED BIG DATA

CROSS-REFERENCE TO RELATED APPLICATIONS

This application claims priority under 35 U.S.C. § 119 to Korean Patent Application No. 10-2018-0047730, filed on Apr. 25, 2018, in the Korean Intellectual Property Office, the disclosure of which is incorporated herein by reference in its entirety.

TECHNICAL FIELD

Embodiments relate to a system and method for cloud scraping and a computer program therefor, and more particularly, to technology that pre-scrapes predetermined information and stores in a big data storage, and when there is a scraping request from a user terminal provides a response to the scraping request based on the information stored in the big data storage.

BACKGROUND

Recently, with the development of Information & Communication Technology (ICT), various scraping techniques are used to acquire information stored in external institutions. Scraping includes screen scraping involving accessing a financial institution server and extracting only necessary data from data displayed on the screen, and data scraping involving accessing a financial institution server and parsing necessary data from information provided by the financial institution and receiving it.

Meanwhile, recently, cloud scraping referring to scraping using a scraping server is widely used. However, because this cloud scraping technology performs scraping for each scraping request from a user, the throughput increases with the increasing number of scraping requests or the increasing types of requested scraping target external institutions.

SUMMARY

According to an aspect of the present disclosure, there is provided a system and method for cloud scraping in which, for information in a predetermined format, a response to a scraping request from a user terminal is quickly made based on information stored in a big data storage, and a scraping server is efficiently run by referring to an external institution policy, and a computer program therefor.

A cloud scraping system using pre-scraped big data according to an embodiment includes an information providing server which, when receiving a scraping request from a user terminal, provides the user terminal with response information to the received scraping request, and a big data storage which stores pre-scraped information, wherein the information providing server may acquire the response information using the pre-scraped information, when the scraping request is about static information.

In an embodiment, the cloud scraping system using pre-scraped big data may further include a scraping server which performs scraping from an external institution server, wherein when the scraping request is about dynamic information, the information providing server may transmit the scraping request to the scraping server, and the scraping server may scrape the external institution server to acquire response information to the scraping request and transmit the response information to the information providing server.

In an embodiment, the information providing server may transmit the scraping request to the scraping server, when no response information to the scraping request is found in the big data storage.

In an embodiment, the static information may include at least one of an address list, real estate price information, real estate actual transaction information, loan products, interest rate information, economic indicators, and closure or cessation of business information.

In an embodiment, the scraping server may include a single processing scraping server and a multi-processing scraping server, and the information providing server may allocate the scraping request to at least one of the single processing scraping server and the multi-processing scraping server based on policy information of the requested scraping target external institution.

In an embodiment, the cloud scraping system using pre-scraped big data may further include a distribution server placed between the information providing server and the scraping server, wherein the distribution server may distribute the scraping request received from the information providing server to the operable scraping server, and receive response information from the scraping server and transmit the response information to the information providing server.

In an embodiment, the cloud scraping system using pre-scraped big data may further include a scraping error modification server, which in the event that an error occurs while the user terminal directly performs scraping, analyzes an error log from scraping input information inputted in the user terminal when the error occurs, and updates a scraping module in the user terminal based on the analyzed error log.

A cloud scraping method using pre-scraped big data performed by a cloud scraping system according to an embodiment includes receiving a scraping request from a user terminal, determining a property of the scraping request, when the scraping request is about static information, generating response information using pre-scraped information stored in a big data storage, and providing the generated response information to the user terminal.

In an embodiment, the cloud scraping method using pre-scraped big data may further include, when the scraping request is about dynamic information, scraping an external institution server to acquire response information to the scraping request.

In an embodiment, the generating of response information using pre-scraped information may include, when no response information to the scraping request is found in the big data storage, scraping an external institution server to acquire response information to the scraping request.

In an embodiment, the static information may include at least one of an address list, real estate price information, real estate actual transaction information, loan products, interest rate information, economic indicators, and closure or cessation of business information.

In an embodiment, the cloud scraping method using pre-scraped big data may further include allocating the scraping request to at least one of a single processing scraping server and a multi-processing scraping server based on policy information of the requested scraping target external institution.

In an embodiment, the cloud scraping method using pre-scraped big data may further include, in the event that an error occurs while the user terminal directly performs scraping, analyzing an error log from scraping input information inputted in the user terminal when the error occurs, and updating a scraping module in the user terminal based on the analyzed error log.

A computer program stored in a computer-readable recording medium according to an embodiment may be combined with hardware to perform the above-described method.

According to the system and method for cloud scraping using pre-scraped big data in accordance with an aspect of the present disclosure, a response is quickly made to a scraping request from a user terminal by pre-scraping and storing static information in the big data storage.

Additionally, according to the system and method for cloud scraping using pre-scraped big data in accordance with an aspect of the present disclosure, scraping server operation efficiency is improved by making a proper use of the single or multi-processing scraping server based on policy information of a scraping target external institution.

Further, according to the system and method for cloud scraping using pre-scraped big data in accordance with an aspect of the present disclosure, an error occurring when a user terminal directly performs scraping is analyzed at the cloud scraping system end, and to solve the error, a scraping module of the user terminal is updated.

DETAILED DESCRIPTION OF EMBODIMENTS

Hereinafter, embodiments of the present disclosure will be described in detail with reference to the accompanying drawings.

Figure 1:
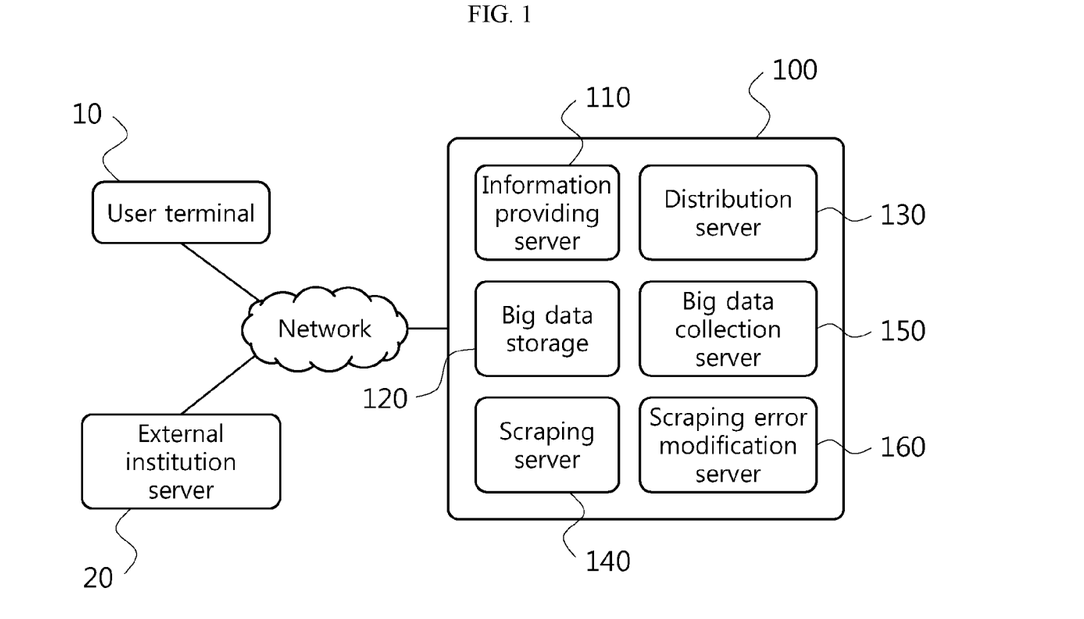
FIG. 1 is a schematic block diagram showing the architecture of a cloud scraping system using pre-scraped big data according to an embodiment.

FIG. 1 is a schematic block diagram showing the architecture of a cloud scraping system using pre-scraped big data according to an embodiment.

Referring to FIG. 1, the cloud scraping system 100 using pre-scraped big data according to embodiments may include an information providing server 110 and a big data storage 120. In other embodiment, the cloud scraping system 100 using pre-scraped big data may further include at least one of a distribution server 130, a scraping server 140, a big data collection server 150 and a scraping error modification server 160.

The cloud scraping system 100 using pre-scraped big data according to embodiments may have aspects that are wholly in hardware, or partly in hardware and partly in software.

The term "unit", "module", "server", "system", "platform", "device" or "terminal" as used herein is intended to indicate a combination of hardware and software that runs by the corresponding hardware. For example, here, hardware may be a data processing device including a CPU or other processor. Additionally, software that runs by hardware may refer to a process in execution, an object, an executable, a thread of execution and a program.

The cloud scraping system 100 may be connected to a user terminal 10 and an external institution server 20 via a wired and/or wireless network, allowing communication therebetween. A method for communication via a wired and/or wireless network may include all communication methods that enables networking between objects, and is not limited to wired communication, wireless communication, 3G, 4G, 5G or other methods.

The communication between the cloud scraping system 100 and the user terminal 10 may be performed through Application Programming Interface (API) specified in the cloud scraping system 100. The API receives financial processing results and user interface via communication with the cloud scraping system 100 through the preset protocol, and further, directly specifies a tool for developing application programs and services.

The user terminal 10 is a device that is used by a user to scrape and acquire predetermined information from the external institution server 20 through the cloud scraping system 100. The user terminal 10 may include an input device to input data, an output device to output the processing results, and a computing device to compute and process data inputted through the input device to generate the processing results. The user terminal 10 communicates with the external institution server 20 or the scraping system 100 based on the input data, and receives and outputs the processing results to allow the user to scrape and see the predetermine information. The user terminal 10 may include a mobile computing device such as smartphones, a personal computer (PC), a laptop computer, a netbook, a Tablet PC and a Personal Digital Assistant (PDA), but is not limited thereto.

The user terminal 10 may directly scrape specific information from the external institution server 20 through a scraping module possessed therein, and make a scraping request and receive the results through the cloud scraping system 100.

The external institution server 20 refers to any server that stores various information such as banks, stock brokerages and public organizations. The information possessed by the external institution server 20 may be classified into static information that does not change over time and dynamic information that changes in real time. For example, information associated with past records may be said to be static information, and information that is newly updated in real time may be said to be dynamic information.

Figure 2:
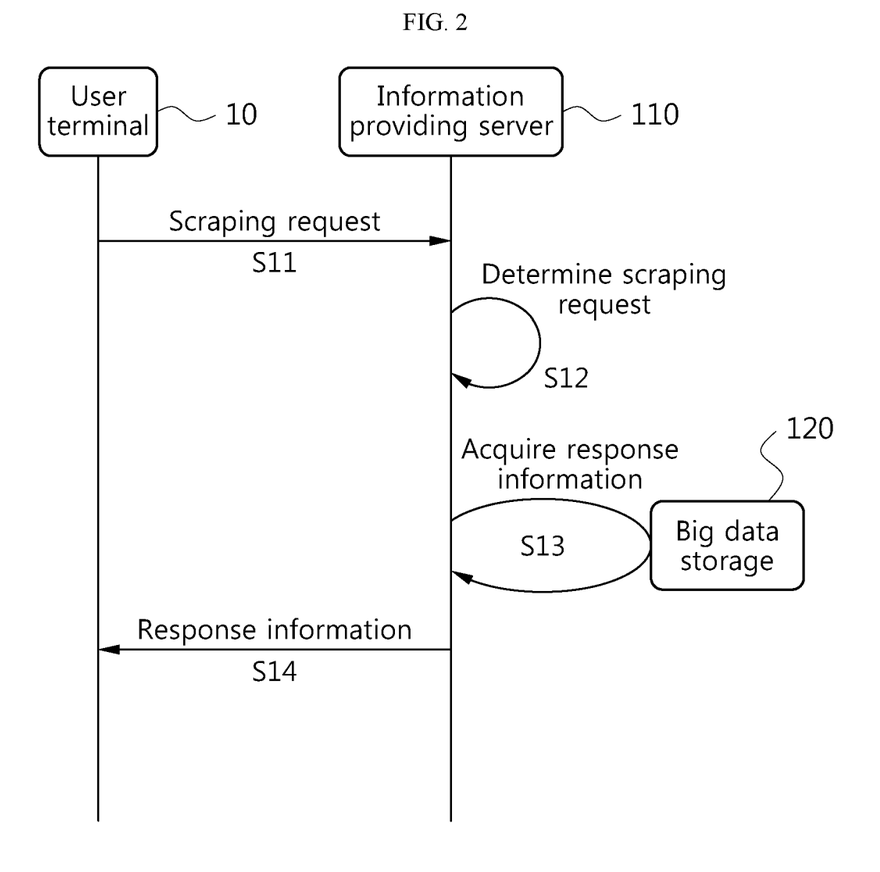
FIGS. 2 and 3 are flowcharts showing a process of a cloud scraping method using pre-scraped big data according to an embodiment.
Figure 3:
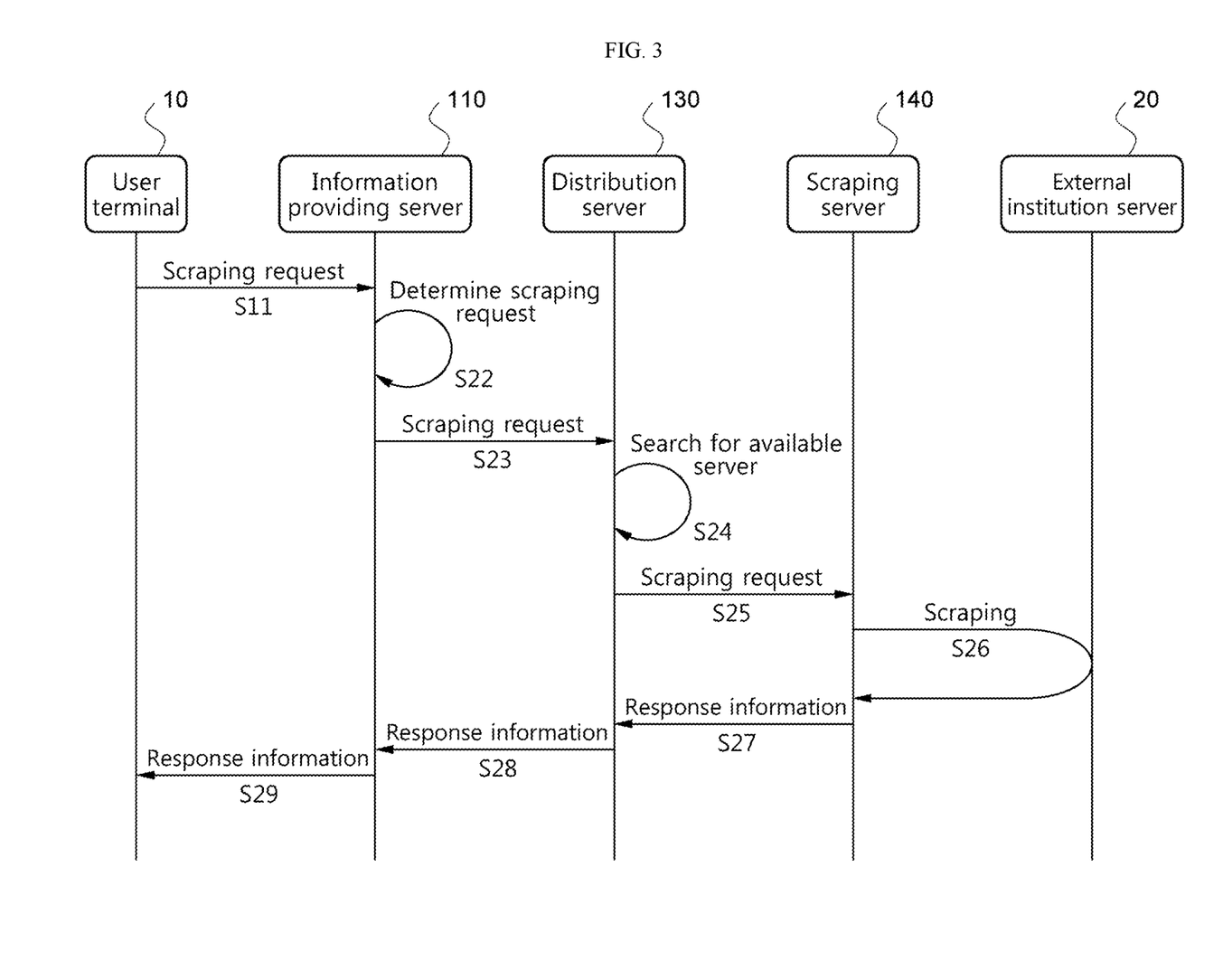

FIGS. 2 and 3 are flowcharts showing a process of a cloud scraping method using pre-scraped big data according to an embodiment. The cloud scraping method using pre-scraped big data according to embodiments may be implemented by the elements of the above-described cloud scraping system using pre-scraped big data.

Referring to FIG. 2, the information providing server 110 receives a scraping request from the user terminal 10 (S11). Subsequently, the information providing server 110 determines whether the scraping request is about static information or dynamic information by determining a property of the scraping request (S12).

In an embodiment, before receiving the scraping request, the information providing server 110 may issue an authentication key to the user terminal 10, and verify the user of the user terminal by verify the authentication key.

When the scraping request is about static information, the information providing server 110 may acquire response information using pre-scraped information stored in the big data storage 120 (S13). Here, 'pre-scraped information' refers to a result obtained by performing cloud scraping matters the user is expected to make scraping requests beforehand periodically and/or non-periodically. Because static information does not change, when static information is pre-scraped and constructed in the big data storage 120, a quick response may be made to the user's scraping request.

Subsequently, the information providing server 110 provides the response information to the user terminal 10 (S14). In the above-described process, for scraping processing, when authentication information from the user terminal 10 is provided to the cloud scraping system, the information providing server 110 deletes the authentication information immediately after finishing the use of the authentication information, to remove a security risk of the user's authentication information.

FIG. 3 shows a case in which a scraping request from the user terminal 10 is about dynamic information.

Referring to FIG. 3, because dynamic information is preferably acquired by scraping from the external institution server 20 in real time, the scraping server 140 is necessary to perform scraping. Additionally, the distribution server 130 may be included in the cloud scraping system to properly distribute a scraping request to the scraping server 140.

Referring to FIG. 3, the information providing server 110 receives a scraping request from the user terminal 10 (S21), and determines whether the scraping request is about static or dynamic information by determining a property of the scraping request (S22).

When the scraping request is about dynamic information, the information providing server 110 transmits the scraping request to the scraping server (S23, S25), and the scraping server 140 acquires response information to the scraping request by scraping the external institution server 20 (S26). Subsequently, the scraping server 140 transmits the response information to the information providing server (S27, S28). Subsequently, the information providing server 110 provides the response information to the user terminal 10 (S29).

Additionally, in some instance, even though the scraping information is about static information, response information thereto may not be stored in the big data storage. Accordingly, when the information providing server 110 fails to find response information to the scraping request in the big data storage 120, the information providing server 110 may transmit the scraping request to the scraping server 140. That is, the first is to find an answer to the scraping request in the big data storage 120, and when an answer is not found, the next is to find response information to the scraping request through the scraping server 140.

Here, static information stored in the big data storage 120 is information featuring a longer information update cycle, and for example, may include at least one of an address list, real estate price information, real estate actual transaction information, loan products, interest rate information, economic indicators and closure or cessation of business information, but the present disclosure is not limited thereto. The static information may include any type of information when the information is pre-stored in the big data storage 120 to increase the efficiency in responding to the scraping request.

Figure 4:
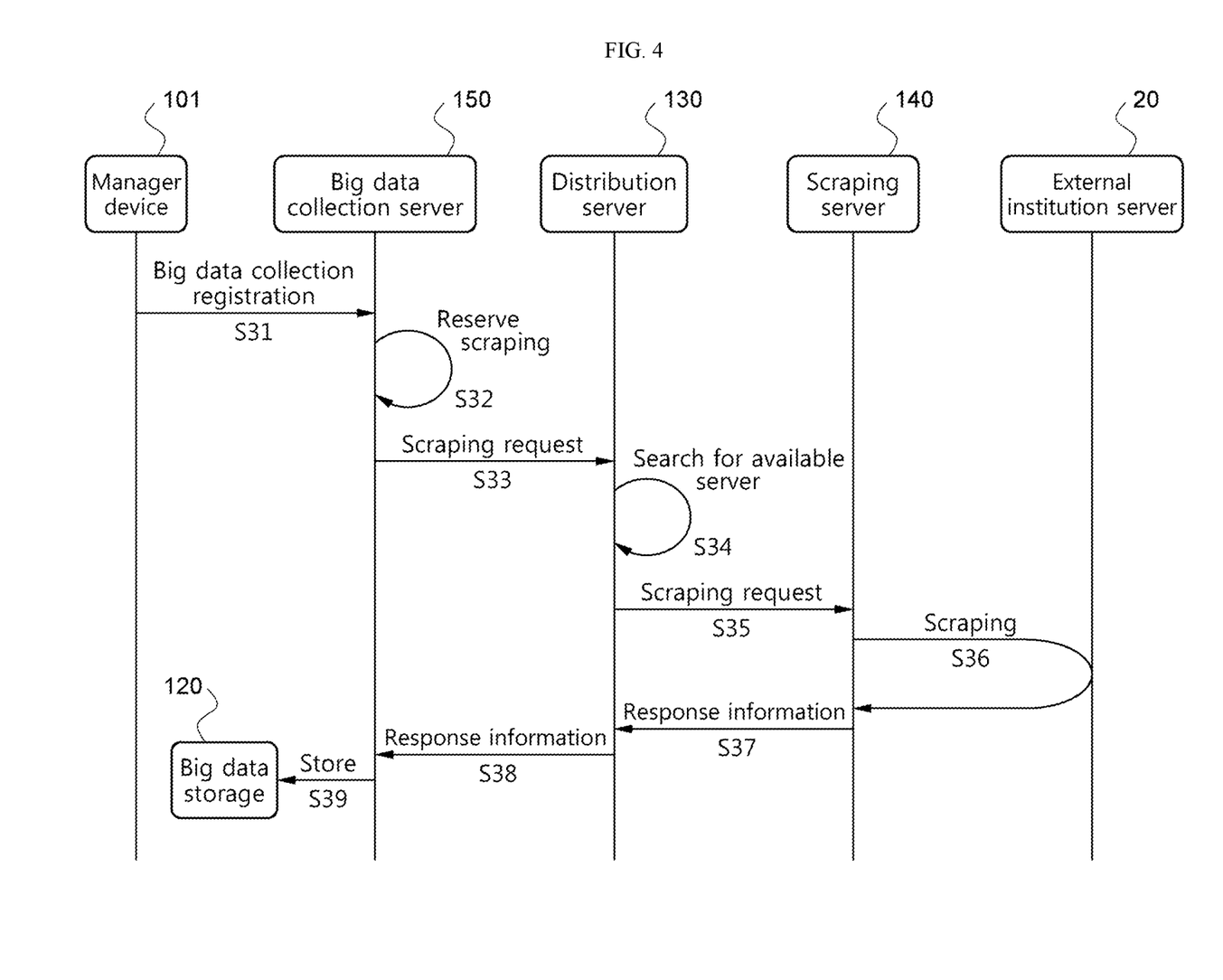
FIG. 4 is a flowchart illustrating a process of constructing pre-scraped information in a big data storage according to an embodiment of the present disclosure.

FIG. 4 is a flowchart illustrating a process of constructing pre-scraped information in the big data storage 120 according to an embodiment of the present disclosure.

Referring to FIG. 4, a manager device 101 of the cloud scraping system 100 using pre-scraped big data may transmit big data collection registration to the big data collection server 150 (S31). Here, the manager device 101 refers to a computing device used by a manager that runs the cloud scraping system 100 using pre-scraped big data.

Subsequently, the big data collection server 150 reserves scraping based on the big data collection registration information (S32), and transmits a scraping request to the distribution server 130 according to the reserved schedule (S33). The distribution server 130 searches for the available scraping server 140 (S34), and allocates the scraping request to the scraping server 140 (S35). The scraping server 140 allocated with the scraping request performs scraping from the external institution server 20 (S36), and transmits the resulting response information to the distribution server 130 (S37). The distribution server 130 transmits the response information to the big data collection server 150 again, and the big data collection server 150 stores the response information in the big data storage 120.

Accordingly, the response information to the predetermined scraping request planned by the manager device 101 may be pre-scraped and constructed in the big data storage 120.

Referring to FIG. 3 again, the information providing server 110 may transmit the scraping request to the scraping server 140 directly or via the distribution server 130. The distribution server 130 may search for an available scraping server based on the scraping request (S24), and determine the scraping server 140 and allocate the scraping request to the determined scraping server 140. Additionally, the distribution server 130 may receive the response information from the scraping server 140, the response information acquired by scraping of the scraping server 140 (S27), and transmit to the information providing server 110.

Additionally, the distribution server 130 may monitor the working state of the scraping server, and perform an automatic scraping engine distribution function. Additionally, the distribution server 130 may select an available scraping server according to the maximum multiple scraping throughput for each server and for each task.

Figure 5:
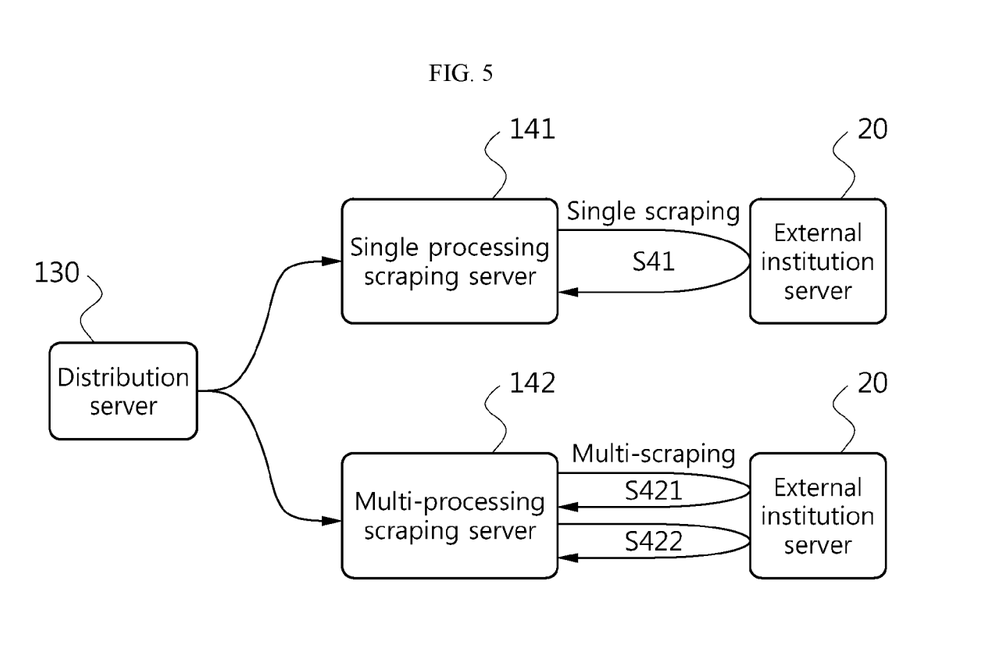
FIG. 5 is a block diagram showing scraping operation environment according to the type of scraping server according to an embodiment of the present disclosure.

FIG. 5 is a block diagram showing scraping operation environment according to the type of the scraping server 140 according to an embodiment of the present disclosure.

Referring to FIG. 5, the scraping server may include a single processing scraping server and a multi-processing scraping server. In the embodiments of the present disclosure, all the servers including the distribution server 130, the single processing scraping server 141 and the multi-processing scraping server 142 may have double or multiple configurations with at least two sets of equipment that perform the same function to avoid any obstruction caused by the communication environment. Accordingly, it should be understood that the distribution server 130, the single processing scraping server 141 and the multi-processing scraping server 142 shown in FIG. 5 are not intended to limit the number or type of equipment that actually operates.

The information providing server 110 may allocate a scraping request to at least one of the single processing scraping server 141 and the multi-processing scraping server 142 based on policy information of a requested scraping target external institution. The information providing server 110 may identify the target external institution through analysis of the scraping request, and determine single processing or multi-processing scraping by referring to policy information of the identified external institution.

For example, when the policy information of the external institution only permits single login to the external institution server 20, the information providing server 110 may allocate the scraping request to the single processing scraping server 141 through the distribution server 130. In this case, the single processing scraping server 141 may perform single scraping (S41).

As opposed to this, when the policy information of the external institution permits multi-login to the external institution server 20, the information providing server 110 may allocate the scraping request to each multi-processing scraping server 142 through the distribution server 130. In this case, the multi-processing scraping server 142 may perform multi-scraping after multi-login (S421, S422). In the distribution to the multi-processing scraping server 142, the distribution server 130 may identify scraping workloads currently allocated to each multi-processing scraping server 142, and allocate a scraping task to the multi-processing scraping server 142 with a pipeline that does not perform a task now.

Figure 6:
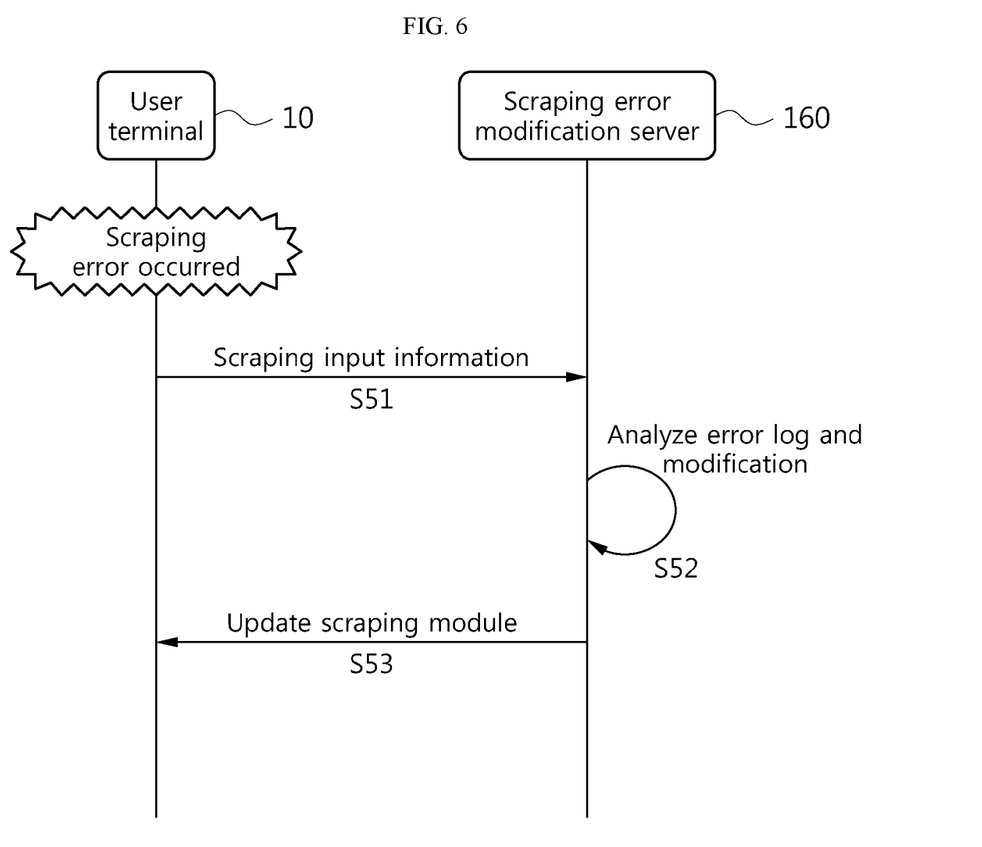
FIG. 6 is a flowchart illustrating a procedure for modifying an error when the error occurs while a user terminal directly performs scraping, in an embodiment of the present disclosure.

FIG. 6 is a flowchart illustrating a procedure for modifying an error when the error occurs while the user terminal directly performs scraping, in an embodiment of the present disclosure.

The cloud scraping system according to the embodiments performs scraping in response to the request received from the user and provides the results, but in addition, in the client scraping operation involving scraping directly performed by the user terminal, to solve an error occurring in the scraping module on the user terminal, may perform an operation of updating the scraping module on the user terminal.

Conventionally, when an error occurs while the user terminal directly performs scraping, in general, the error is modified through a developer's remote access to the user terminal or by transmitting an error log to the server. However, in the case of remote access, the user has to install a separate program in the user terminal, and the user's personal information may be leaked while the error log is transmitted to the server, and in the case of many logs, may be lost. Additionally, because response information from the scraping target external institution is in different formats for each user, it is required to possess test accounts of various cases.

According to an embodiment of the present disclosure, to solve this problem, upon scraping, input information is encrypted, the scraping error modification server 160 receives it, and tests through cloud scraping, thereby modifying the error quickly.

Referring to FIG. 6, in the event that a scraping error occurs while the user terminal 10 performs scraping, the scraping error modification server 160 may receive scraping input information inputted in the user terminal 10 when the error occurs (S51), and modify the error by analyzing the error log (S52). In this case, the received scraping input information may be in encrypted state.

For example, the scraping error modification server 160 may determine that a scraping error occurs when a data part A1 previously analyzed by the scraping module and a data part A2 obtained by currently scraping corresponding to the pre-analyzed data part A1 are different. Here, the pre-analyzed data part used in determining if a scraping error occurs may include at least one of a unique value, tag information and parsed information that may identify the corresponding external institution server.

Additionally, when the scraping error modification server 160 determines that a scraping error occurs, the scraping error modification server 160 may generate an error log. Here, the error log may include at least one of a log time, a platform type, an app ID, library version information, a device ID and an error code.

Subsequently, the scraping error modification server 160 may derive an error cause by comparing the error log with a data part including the pre-analyzed data part A1, and modify the data part A2 obtained by currently scraping based on the error cause. Further, the scraping error modification server 160 may update the scraping module (not shown) in the user terminal 10 to modify the error cause. The updating of the scraping module in the user device 10 may be performed by receiving data input corresponding to updated scraping module from administrator and transmitting the same to the user device 10.

For example, the scraping error modification server 160 may transmit a software update request in the user terminal 10 to the user terminal 10, and transmit data for scraping module update to the user terminal 10 in response to update request acceptance of the user terminal 10.

Here, the scraping input information may include various information related to finance such as a bank code, a class (personal banking or business banking), a requested service type (all accounts inquiry, transaction details inquiry, etc.), an account number, a card code, a login electronic signature value, a settlement date, a search start date or a search end date. In this instance, the scraping error modification server 160 may receive a login electronic signature value obtained by processing the user's authentication information according to an authentication method required by the financial institution, and based on this, modify the error of the scraping module, thereby preventing a security risk caused by the transmission of original data of the user's authentication information to an external server such as the scraping error modification server 160. Additionally, the user's login electronic signature value is deleted from the scraping error modification server 160 in response to the reception of update request acceptance of the user terminal 10, thereby preventing a potential security risk caused by the login electronic signature value remaining on the server after the update of the scraping module.

With the system and method for cloud scraping using pre-scraped big data according to the embodiments of the present disclosure as described hereinabove, an advantage is that it is possible to quickly respond to a scraping request from the user terminal 10 afterwards by pre-scraping and storing static information in the big data storage. Additionally, advantages are that it is possible to improve the scraping server operation efficiency by making a proper use of the single or multi-processing scraping server based on policy information of a scraping target external institution, and solve an error occurred when the user terminal 10 directly performs scraping by analyzing the error at the cloud scraping system end and updating the scraping module of the user terminal 10.

Meanwhile, the cloud scraping method using pre-scraped big data according to the embodiments as described hereinabove may be at least partially implemented as a computer program and recorded in computer-readable recording media. The program for implementing the cloud scraping method using pre-scraped big data is recorded in the recording media according to the embodiments, and the recording media includes any type of recording device in which computer-readable data can be stored. For example, the computer-readable recording media includes ROM, RAM, CD-ROM, magnetic tape, floppy disk, and optical data storing devices. Additionally, the computer-readable recording media is distributed over computer systems connected via a network so that computer-readable codes may be stored and executed in distributed manner. Additionally, functional programs, codes and code segments for realizing this embodiment will be easily understood by those having ordinary skill in the technical field to which this embodiment belongs.

Figure 7:
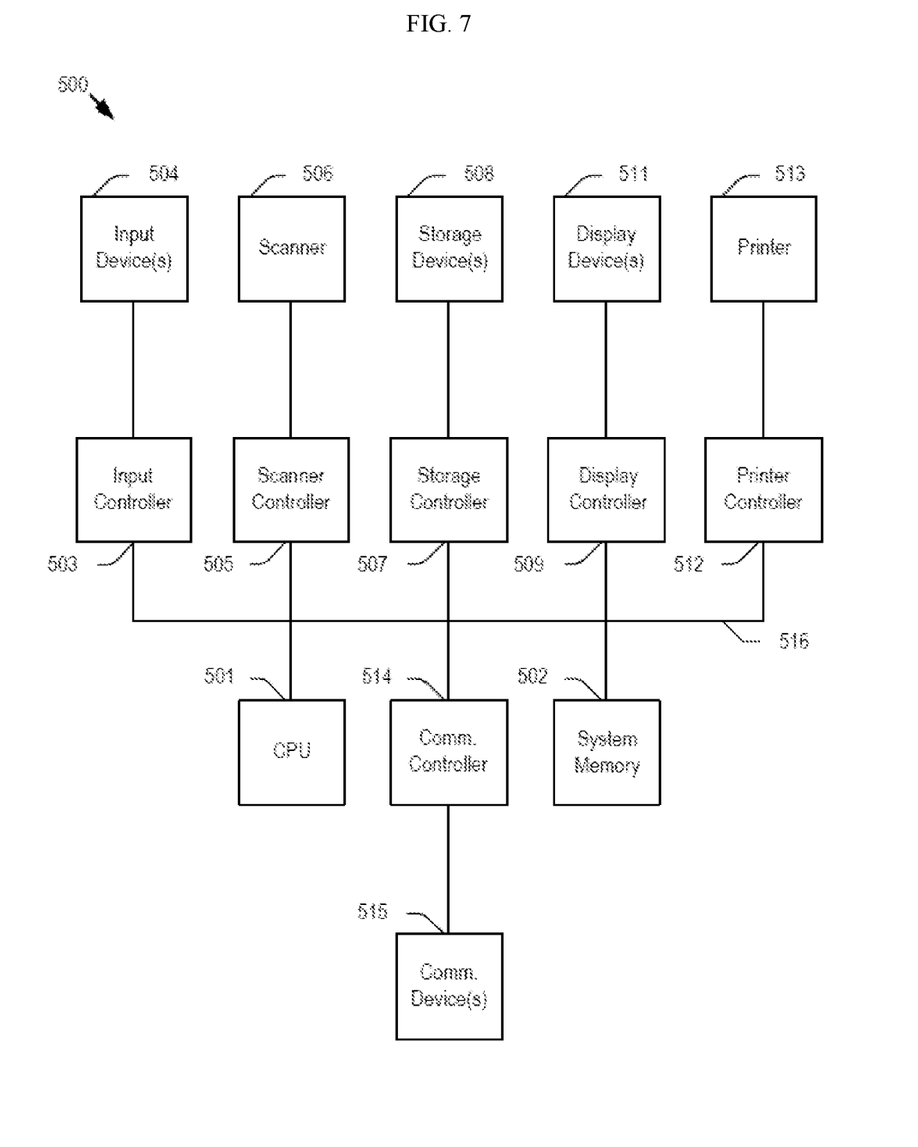
FIG. 7 is a block diagram showing the hardware architecture of a cloud scraping system using pre-scraped big data according to an embodiment.

FIG. 7 is a block diagram showing the hardware architecture of a cloud scraping system using pre-scraped big data according to an embodiment.

It will be understood that the functionalities shown for system 500 may operate to support various embodiments of a cloud scraping system using pre-scraped big data although it shall be understood that a cloud scraping system using pre-scraped big data may be differently configured and include different components. As illustrated in FIG. 5, the system 500 includes a central processing unit (CPU) 501 that provides computing resources and controls the computer. CPU 501 may be implemented with a microprocessor or the like, and may also include a graphics processor and/or a floating point coprocessor for mathematical computations. The system 500 may also include a system memory 502, which may be in the form of random-access memory (RAM) and read-only memory (ROM).

A number of controllers and peripheral devices may also be provided, as shown in FIG. 5. An input controller 503 represents an interface to various input device(s) 504, such as a keyboard, mouse, or stylus. There may also be a scanner controller 505, which communicates with a scanner 506. The system 500 may also include a storage controller 507 for interfacing with one or more storage devices 508 each of which includes a storage medium such as magnetic tape or disk, or an optical medium that might be used to record programs of instructions for operating systems, utilities and applications which may include embodiments of programs that implement various aspects of the present invention.

Storage device(s) 508 may also be used to store processed data or data to be processed in accordance with the invention. The system 500 may also include a display controller 509 for providing an interface to a display device 511, which may be a cathode ray tube (CRT), a thin film transistor (TFT) display, or other type of display. The system 500 may also include a printer controller 512 for communicating with a printer 513. A communications controller 514 may interface with one or more communication devices 515, which enables system 500 to connect to remote devices through any of a variety of networks including the Internet, an Ethernet cloud, an FCoE/DCB cloud, a local area network (LAN), a wide area network (WAN), a storage area network (SAN) or through any suitable electromagnetic carrier signals including infrared signals.

In the illustrated system, all major system components may connect to a bus 516, which may represent more than one physical bus. However, various system components may or may not be in physical proximity to one another. For example, input data and/or output data may be remotely transmitted from one physical location to another. In addition, programs that implement various aspects of this invention may be accessed from a remote location (e.g., a server) over a network. Such data and/or programs may be conveyed through any of a variety of machine-readable medium including, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices.

The cloud scraping system according to embodiments achieve a technical improvement by configuring the information providing server to acquire certain information pre-emptively before a user requests such information. In the conventional system, scraping of information was performed in response to request from users, and thus, the users had to wait for completion of scraping process until they receive the requested information. The system according to embodiments of the present invention solves the problem of the conventional system by pre-scraping and storing static information in a big data storage so that the static information can be provided quickly to the user without repeating the scraping process.

Further, the cloud scraping system according to embodiments achieve another technical improvement by making a proper use of the single or multi-processing scraping server based on policy information of a scraping target external institution thereby increasing server operation efficiency.

The present disclosure has been hereinabove described with reference to the embodiments shown in the accompanying drawings, but this is for illustration only and those having ordinary skill in the art will appreciate that various modifications may be made to the embodiments. However, it should be noted that such modifications fall in the scope of technical protection of the present disclosure. Therefore, the true scope of technical protection of the present disclosure should be defined by the technical spirit of the appended claims.

What is claimed is:

1. A cloud scraping system using pre-scraped big data, comprising:
   an information providing server which, when receiving a scraping request from a user terminal, provides the user terminal with response information to the received scraping request;
   a big data storage which stores pre-scraped information, and
   a scraping server which performs scraping from an external institution server,
   wherein the information providing server acquires the response information using the pre-scraped information, when the scraping request is about static information,
   wherein when the scraping request is about dynamic information, the information providing server transmits the scraping request to the scraping server, and the scraping server scrapes the external institution server to acquire response information to the scraping request and transmits the response information to the information providing server, and
   wherein the information providing server transmits the scraping request to the scraping server, when no response information to the scraping request is found in the big data storage.

2. The cloud scraping system using pre-scraped big data according to claim 1, wherein the static information includes at least one of an address list, real estate price information, real estate actual transaction information, loan products, interest rate information, economic indicators, and closure or cessation of business information.

3. A cloud scraping method using pre-scraped big data performed by a cloud scraping system, comprising:
   receiving a scraping request from a user terminal;

determining a property of the scraping request;

when the scraping request is about static information, generating response information using pre-scraped information stored in a big data storage;

when the scraping request is about dynamic information, scraping an external institution server to acquire response information to the scraping request; and providing the generated response information to the user terminal, wherein the generating of response information using pre-scraped information comprises:

when no response information to the scraping request is found in the big data storage, scraping an external institution server to acquire response information to the scraping request.

4. The cloud scraping method using pre-scraped big data according to claim 3, wherein the static information includes at least one of an address list, real estate price information, real estate actual transaction information, loan products, interest rate information, economic indicators, and closure or cessation of business information.

5. A computer program stored in a recording medium to perform the cloud scraping method using pre-scraped big data according to claim 3 in combination with hardware.

* * * * *